US011370665B2

(12) United States Patent
Lou et al.

(10) Patent No.: US 11,370,665 B2
(45) Date of Patent: Jun. 28, 2022

(54) METHOD FOR PRODUCING ACTIVATED CARBON

(71) Applicant: Beyonder AS, Sandnes (NO)

(72) Inventors: Fengliu Lou, Stavanger (NO); Svein Kvernstuen, Sandnes (NO)

(73) Assignee: Beyonder AS, Sandnes (NO)

( * ) Notice: Subject to any disclaimer, the term of this patent is extended or adjusted under 35 U.S.C. 154(b) by 331 days.

(21) Appl. No.: 16/493,209

(22) PCT Filed: Mar. 20, 2018

(86) PCT No.: PCT/NO2018/050081
§ 371 (c)(1),
(2) Date: Sep. 11, 2019

(87) PCT Pub. No.: WO2018/186747
PCT Pub. Date: Oct. 11, 2018

(65) Prior Publication Data
US 2020/0048099 A1 Feb. 13, 2020

(30) Foreign Application Priority Data
Apr. 6, 2017 (NO) .................................. 20170575

(51) Int. Cl.
*C01B 31/12* (2006.01)
*C01B 32/336* (2017.01)
*C01B 32/348* (2017.01)
*H01G 11/34* (2013.01)
*H01G 11/86* (2013.01)

(52) U.S. Cl.
CPC .......... *C01B 32/336* (2017.08); *C01B 32/348* (2017.08); *H01G 11/34* (2013.01); *H01G 11/86* (2013.01); *C01P 2006/12* (2013.01); *C01P 2006/40* (2013.01)

(58) Field of Classification Search
CPC .................................................. C01B 32/348
See application file for complete search history.

(56) References Cited

U.S. PATENT DOCUMENTS

| 5,143,889 | A | 9/1992 | Takahiro et al. | |
|---|---|---|---|---|
| 5,416,056 | A | 5/1995 | Baker | |
| 8,563,467 | B2 * | 10/2013 | Hashisho | B01J 20/3085 502/432 |
| 2012/0174936 | A1 | 7/2012 | Branton et al. | |
| 2013/0004408 | A1 | 1/2013 | Dua et al. | |
| 2013/0089738 | A1 | 4/2013 | Al-Zahran et al. | |
| 2014/0056798 | A1 | 2/2014 | Fletcher et al. | |
| 2015/0340169 | A1 | 11/2015 | Qiu et al. | |

FOREIGN PATENT DOCUMENTS

| BR | P10501030 | 3/2007 |
|---|---|---|
| CN | 105645410 | 6/2016 |
| FR | 818175 | 9/1937 |
| GB | 484197 | 4/1938 |
| JP | 2011020907 | 2/2011 |
| JP | 2011-079705 | 4/2011 |
| JP | 2011079705 A | 4/2011 |
| JP | 2011-176043 | 9/2011 |
| JP | 2016-030697 | 3/2016 |
| WO | 2014077714 | 5/2014 |
| WO | 2014134000 | 9/2014 |
| WO | 2015197887 | 12/2015 |
| WO | 2016013619 | 1/2016 |

OTHER PUBLICATIONS

E. Ekinci et al., "Characterization and Application of Activated Carbon Produced by H3PO4 and Water Vapor Activation", Oct. 2006.
F. Caturla et al., "Preparation of Activated Carbon by Chemical Activation with ZnCl2", Dec. 3, 1990.
V. Boonamnuayvitaya et al., "Preparation of Activated Carbons from Coffee Residue for the Absorption of Formaldehyde", Oct. 23, 2003.
Norwegian Search Report for No. 20170575, dated Nov. 13, 2017.
International Search Report and Written Opinion for PCT/NO2018/050081, dated May 14, 2019.
Response to the Written Opinion for PCT/NO2018/050081, dated Aug. 17, 2018.
Written Opinion for PCT/NO2018/050081, dated Oct. 9, 2018.
International Preliminary Report on Patentability dated Mar. 11, 2019.
Office Action issued in Japanese Patent Application No. 2019-554821, dated Apr. 12, 2022.

* cited by examiner

*Primary Examiner* — Stuart L Hendrickson
(74) *Attorney, Agent, or Firm* — Andrus Intellectual Property Law, LLP

(57) ABSTRACT

A method is for producing activated carbon. The method includes: a) mixing a carbonaceous precursor with chemically activating agents to obtain a feedstock mixture; b) producing activated carbon by heating the feedstock mixture under the atmosphere of a physically activating gas; and c) performing suitable post-activation treatment of the produced activated carbon. Step a) includes in sequence the sub-steps of: i. addition of a first chemically activating agent to obtain an impregnated precursor; and ii. addition of a second chemically activating agent to obtain the feedstock mixture. An activated carbon species is obtainable by the method. The activated carbon species may thus be tuned to have a pore size distribution optimized for use in a carbon electrode.

9 Claims, 3 Drawing Sheets

METHOD FOR PRODUCING ACTIVATED CARBON

CROSS-REFERENCE TO RELATED APPLICATIONS

This application is the U.S. national stage application of International Application PCT/NO2018/050081, filed Mar. 20, 2018, which international application was published on Oct. 11, 2018, as International Publication WO 2018/186747 in the English language. The International Application claims priority of Norwegian Patent Application No. 20170575, filed Apr. 6, 2017. The international application and Norwegian application are both incorporated herein by reference, in entirety.

FIELD

The invention relates to a method for producing activated carbon, said method comprising the steps of: mixing a carbonaceous precursor with chemically activating agents to obtain a feedstock mixture; producing activated carbon by heating the feedstock mixture under the atmosphere of a physically activating gas; and performing suitable post-activation treatment of the produced activated carbon. The invention also relates to an activated carbon species obtainable by such a method.

BACKGROUND

Activated carbon, also called active carbon, refers to a group of amorphous carbonaceous materials with a high degree of porosity and well-developed specific surface area (i.e. surface area per unit mass). It is normally manufactured by pyrolysis of different carbon-containing substances followed by activation through physical or chemical processes, and it can exist in many different forms, e.g. granules, powder, fibrous materials, cloth or monoliths. Activated carbon has been widely utilized in industrial fields, e.g. as an electrode material for supercapacitors, as a sorbent for water and gas purification, and as a metal-free catalyst or catalyst support due to its well-developed porosity, high specific surface area, and good thermal and chemical stability. The main criteria for selecting an activated carbon for a given application are its surface chemical composition, purity, electrical conductivity, and porous texture properties such as pore volume, specific surface area, and pore size distribution. The increasing attentions on electrical energy storage, pollution clean-up, and environmentally-friendly products are stimulating significant increase in demand for activated carbon.

Activated carbon can be produced from various carbonaceous source materials, including fossil-fuel sources such as petroleum coke, coal, and coal tar, biomass sources such as nutshells, coconut husk, and wood, and synthetic polymers such as polyacrylonitrile, polyvinylidene chloride, and phenolic resins, through physical or chemical activation. The choice of raw materials for activated carbon can affect the structure, purity, surface chemical composition, electrical conductivity, particle size, and texture properties of the final product. In selection of the raw materials, its price is often the deciding factor. Therefore, a large part of the activated carbon is nowadays manufactured from biomass due to its affordability, wide availability, and high sustainability. However, synthetic polymers have the advantage of high purity, so they are normally selected for the production of high purity activated carbon.

Most carbonaceous materials can be converted into activated carbon through pyrolysis and activation. The properties of the final product to a large degree depend on the nature of the raw carbonaceous precursor material, the nature of the activating agent, and the conditions of the activation process. The preparation of activated carbon with different textural properties can be achieved through physical or chemical activation processes. Physical activation generally involves the carbonization of carbonaceous precursors in an inert atmosphere to remove the volatile components, followed by activation in the presence of a suitable gasification agent, such as steam, carbon dioxide, oxygen, air, ammonia, or a gas mixture containing any of these gases, to develop the porosity at a high temperature. The generation of porosity takes place via selective elimination of the more reactive carbon of the structure, and further gasification leads to the production of the activated carbon with the sought pore structure. In general, the activation with carbon dioxide leads to the creation and widening of small micropores, whereas activation with steam only promotes widening of the existing micropores. Additionally, activated carbon with low oxygen content can be produced when ammonia is selected as activating agent.

Chemical activation is generally conducted by mixing carbonaceous materials with a chemically activating agent, such as potassium hydroxide, zinc chloride, or phosphoric acid, followed by activation under inert gas at a high temperature. Chemical activation methods have been utilized to produce activated carbons for many years, and the activation mechanism has been investigated intensively. It is a generally accepted view on the specific activation mechanism of alkali metal compounds, such as potassium hydroxide, that it comprises redox reactions between the carbon structure and the metal compound, metal intercalation into the carbon lattice, and steam- and carbon dioxide-resulted gasification. Therefore, activated carbon with a wide range of pore size distributions can be produced in a very efficient way by utilizing alkali metal compounds as activating agents. In chemical activation with phosphoric acid and metal chlorides, such as zinc chloride, these chemicals act as dehydrating agents which alter the pyrolysis behaviour of carbonaceous materials, thereby causing less of the objectionable tarry products to be formed. Both phosphoric acid and metal chloride cause hydrogen and oxygen atoms in the source materials to be stripped away as water rather than as hydrocarbons or oxygenated organic compounds. As a result, the carbon yield is generally higher than that from physical activation. In addition, pore size distribution of activated carbon can be somewhat controlled by tuning the mass ratio of carbonaceous precursor and phosphoric acid or metal chloride. Compared to physical activation, chemical activation has superior advantages, such as lower activation temperatures, higher yields, better efficiency, higher specific surface area, and larger pore volume. However, physical activation has the advantages of mild activation rate, which is favourable for micropore size regulation. Therefore, the combination of physical activation with chemical activation makes the activation process more efficient, controllable, and flexible.

Generally, activated carbon with a predominant pore size can be produced by carefully controlling the activation conditions when a single activating agent is utilized. For example, micropores are preferentially introduced into activated carbon when carbon dioxide or ammonia is selected as activating agent, while mesopores are preferentially introduced into activated carbon when phosphoric acid or zinc chloride with high agent loading is selected as activating agent. Therefore, the combination of two different activating agents in the activation process is used to produce activated carbon with better control over the resulting pore size distribution. Additional benefits of using two activating agents include higher activation efficiency, higher activated carbon yield, and better process flexibility.

Due to the many applications for activated carbon, substantial research is put into methods of its production. For example, a two-stage activation process has been disclosed in U.S. Pat. No. 5,416,056, which comprises a first stage activation with phosphoric acid to introduce wide pores, followed by a second stage activation with potassium hydroxide to introduce micropores. Activated carbon produced by this two-stage activation process is characterized by a high amount of micropores (>85% of total pore volume), and large micropore volume (>0.7 $cm^3/g$). However, this two-stage activation increases the cost of the activation process due to the two consecutive activation steps at high temperature required.

In patent application WO2014/077714A1, a self-activation process has been disclosed. Activated carbon is manufactured from tobacco leaves by simultaneous carbonization and self-activation in an inert gas atmosphere. The activated carbon produced by this method has a specific surface area of 600 to 2000 $m^2/g$, preferably 1700 $m^2/g$, and has an extensive amount of small micropores and mesopores. In the self-activation method, the carbonization and activation processes of the raw material take place simultaneously and autogenously, so the second phase of chemical or physical activation is needless. The ability to carry out the self-activation process depends, however, on the chemical composition of the carbonaceous precursor and the type of substances generated during the carbonization. This is an efficient activation process, but the limitations on the carbonaceous precursor selection is a barrier for a wider application.

Caturla et al. (Carbon, 1991. 29: 999-1007) reported chemical activation of peach stones with zinc chloride followed by physical activation with carbon dioxide to produce activated carbon with high surface area of about 3000 $m^2/g$, and a yield of about 20%. However, it is essentially microporous, which is not favourable as electrode material for supercapacitors.

Virote et al. (Separation and Purification Technology, 2005. 42:159-168) studied the preparation of activated carbon from coffee residues by a concurrently chemical activation with zinc chloride and physical activation with carbon dioxide or steam. A high yield of 80.3% has been achieved when zinc chloride and steam are selected as activating agents. However, the specific surface areas of the obtained activated carbon are lower than 1000 $m^2/g$.

Budinova et al. (Fuel Processing Technology, 2006. 87(10): 899-905) performed activation of woody biomass birch through a combination of chemical activation with phosphoric acid and physical activation with steam in a single activation step. The results show the advantage of combining physical and chemical activation in terms of high specific surface area (1360 $m^2/g$), though it is still not sufficient as electrode material for supercapacitors.

One particularly advantageous implementation of activated carbon is incorporation into a carbon-based electrode of a supercapacitor. A supercapacitor, also known as a double-layer capacitor or ultracapacitor, stores electrical energy by physical charge separation at electrode/electrolyte inter-faces. The mechanism is highly reversible, which allows the supercapacitor to be charged and discharged up to a million times. Additionally, this fast charge separation mechanism also allows the supercapacitor to have high power density. A supercapacitor typically comprises two porous electrodes that are isolated from electrical contact with each other by a porous dielectric separator. The separator and the electrodes are impregnated with an electrolytic solution that allows ionic current to flow between the electrodes while preventing electronic current from discharging the cell. Each electrode is typically in electrical contact with a current collector. The current collector, which can comprise a sheet or plate of electrically conductive material (e.g., aluminium) can reduce internal resistance while providing physical support for the porous electrode material.

As electrode materials for supercapacitors, the performance of activated carbon depends strongly on the porous texture properties, specifically the specific surface area and pore size distribution. The pore size is generally divided into three types: micropores with diameter less than 2 nm, mesopores with a diameter between 2 nm and 50 nm, and macropores with a diameter greater than 50 nm. The micropores strengthen the specific capacitance (i.e. capacitance per unit mass) due mainly to distortion of the solvation shells and shorter distance between the ions and the pore walls, whereby a high energy density is achieved. The mesoporous channels provide low-resistant path-ways for the ions through the porous particles, and the macropores serve as ion-buffering reservoirs to minimize the diffusion distances to the interior surfaces. Accordingly, mesopores and macropores improve the rate capability and thus the power density of supercapacitors. Therefore, the pore size distribution of activated carbon for use in energy storage devices requires careful control to achieve a high specific capacitance, good rate capability, and high energy density. However, the efficient production of activated carbon with a predefined ratio of micropores, mesopores, and macropores is still a challenge by utilizing known methods.

Accordingly, it would be advantageous to provide an activation process for producing activated carbon materials by using a more efficient and flexible route with high yield and control over the resulting porosity and pore size distribution. Such a method will be able to produce activated carbon for a multitude of applications. For example, for the fabrication of carbon-based electrodes that enable efficient, durable, and energy-dense storage devices, the activated carbon should possess a large specific surface area and predetermined pore size distribution.

SUMMARY

The present invention has for its object to remedy or to reduce at least one of the drawbacks of the prior art, or at least provide a useful alternative to prior art. The object is achieved through features, which are specified in the description below and in the claims that follow. The invention is defined by the independent patent claims. The dependent claims define advantageous embodiments of the invention.

In a first aspect, the invention relates more particularly to a method for producing activated carbon, said method comprising the steps of:
 a) mixing a carbonaceous precursor with chemically activating agents to obtain a feedstock mixture;
 b) producing activated carbon by heating the feedstock mixture under the atmosphere of a physically activating gas; and c) performing suitable post-activation treatment of the produced activated carbon, wherein step a) comprises in sequence the sub-steps of
   i. addition of a first chemically activating agent to obtain an impregnated precursor; and
   ii. addition of a second chemically activating agent to obtain the feedstock mixture.

The carbonaceous precursor may come from any source material with sufficient carbon content and purity. In one embodiment, the carbonaceous precursor may be from a source of biomass and derivatives, such as wood, coconut shell, food processing remainders, food waste, newspapers, books, wheat, walnut, corn, rice, potato, beets, millet, soybean, barley, and cotton. In another embodiment, the carbonaceous precursor may be from fossil-fuel sources such as petroleum coke, coals, and coal tar pitches. In another embodiment, the carbonaceous precursor may be from synthetic polymeric materials such as rubber, polyacrylonitrile, polyvinylidene chloride, polyvinyl alcohol, polyaniline, polypyrrole, and phenolic resins. The embodiments are not limited thereto, but may comprise any chemically suitable precursor capable of being carbonized and activated.

The carbonaceous precursor may be a single carbonaceous precursor material or a combination of precursor materials, which can be used to optimize the properties of the activated carbon product. The carbonaceous precursor may be in the form of powder, sheets, fibers, solution, suspension, gel, and any mixture of these forms. The carbonaceous precursor materials may require different pre-treatments, such as washing, drying, grinding, or carbonisation, before mixing with chemically activating agents.

As a first step, the carbonaceous precursor is mixed with a first chemically activating agent to obtain an impregnated precursor. The first chemically activating agent serves as a dehydrating agent to improve the yield and introduce mesopores into the activated carbon. According to various non-limiting embodiments, the first chemically activating agent may be chosen from e.g. $H_3PO_4$, $P_2O_5$, $H_2SO_4$, $MgCl_2$, $AlCl_3$, $CaCl_2$, $FeCl_3$, $ZnCl_2$, or any combination of these agents in any ratio. The embodiments are not limited thereto, but may comprise any chemical capable of dehydrating the carbonaceous precursor.

In embodiments, the carbonaceous precursor may be impregnated with a solution of the first chemically activating agent. If a solution is used, it may preferably be an aqueous solution, but it may also be an organic solvent, such as ethanol, acetone, or isopropyl alcohol. The concentration of the chemically activating agent in the solution may range from about 1-90 wt. %, e.g. 1, 2, 3, 5, 10, 15, 20, 25, 30, 40 50, 60, 70, 80, or 90 wt. %. Using a solution of the first chemically activating agent for the impregnation may promote a more homogenous mixing with the carbonaceous precursor. This mixing may facilitate formation of a more homogeneously activated carbon that comprises a uniform distribution of physical characteristics, including pore size, pore size distribution, pore structure, etc. In other embodiments, the carbonaceous precursor may be combined with the first chemically activating agent to form a dry impregnated precursor material, i.e. without the use of any liquid or solvent, by physical mixing such as grinding or ball milling.

The carbonaceous precursor and the first chemically activating agent may be combined in any suitable ratio to form the impregnated precursor. The specific value of a suitable ratio may depend, for example, on the physical form of the carbonaceous precursor and the first chemically activating agent, and on the concentration if one or both are in the form of a mixture or solution. The ratio of carbonaceous precursor to first chemically activating agent on the basis of dry material weight may range from about 1:10 to 1000:1. For example, the ratio may be about 1:1, 1:2, 1:3, 1:4, 1:5, 1:10, 500:1, 100:1, 25:1, 10:1, or 2:1. The carbonaceous precursor and the first chemically activating agent may be dried for 0.5-72 hours, e.g. for 0.5, 1, 2, 3, 5, 8, 10, 12, 15, 18, 24, 36, 48, or 72 hours, to form the impregnated precursor. The drying may take place at 50-200° C., e.g. 50, 75, 90, 100, 120, 140, 170, or 200° C.

After drying of the impregnated precursor, the feedstock mixture is produced by introducing a second chemically activating agent into the impregnated precursor to improve the activation efficiency and help porosity development during the activation process. The second chemically activating agent may preferably be an alkali metal compound, e.g. KOH, NaOH, LiOH, $K_2CO_3$, $Na_2CO_3$, $Li_2CO_3$, $KHCO_3$, $NaHCO_3$, $LiHCO_3$, $C_7H_7K$ (benzyl potassium), or any combination of these agents in any ratio. The alkali metal may intercalate into the carbon material, and during a later washing step said alkali metal may react with water and generate a large amount of gas, which will exfoliate the carbon material and thus increase the porous surface area. The second chemically activating agent may be mixed with the impregnated precursor by physical mixing such as grinding and ball milling. The ratio of impregnated precursor to second chemically activating agent may range from about 1:10 to 1000:1, e.g. 1:1, 1:2, 1:3, 1:4, 1:5, 1:10, 500:1, 100:1, 25:1, 10:1, or 2:1.

The feedstock mixture may thereafter be heated at a suitable temperature under the atmosphere of a physically activating gas to form activated carbon via simultaneous chemical and physical activation in a single step. In embodiments, the heating means may for example be a conventional furnace, a microwave oven, or laser-induced heating. During heating, the physically activating agent reacts with carbonaceous precursor mainly from the gas phase to generate micropores, while the chemically activating agents react with the carbonaceous precursor primarily from the liquid or solid phase to generate mesopores. This presence of more than one phase makes the activation process more efficient and flexible than single phase activation because physical and chemical activations take place simultaneously in a single step. Additionally, the intensity of these two activations can be easily controlled by tuning the composition of the physically activating gas and the weight ratio of first and second chemically activating agents to carbonaceous precursor, whereby the pore size distribution of the activated carbon can may be adjusted.

In one embodiment, the activation may be performed in a batch process, which may include feeding the feedstock mixture into a crucible and loading the crucible into a temperature-controlled reactor capable of reaching high temperatures, e.g. a conventional furnace or a microwave oven. Suitable crucibles and reactors are stable at high temperature, compatible with microwave processing, and resistant to chemical corrosion from the chemically activating agent. Examples of crucibles can include metallic (nickel or stainless steel) crucibles, quartz crucibles, porcelain crucibles, silicon carbide crucibles or silicon carbide-coated crucibles such as silicon carbide coated mullite. In another embodiment, the feedstock mixture may be introduced into the reactor using a continuous feed process, for example using screw-fed or rotary-fed operation. In yet another embodiment, the carbon material in the feedstock mixture may be activated in a semi-continuous process, where crucibles with the feedstock mixture are conveyed through a high-temperature reactor during the acts of heating and thus activating. The feedstock material may be dry-fed or wet-fed into a reactor. A wet feedstock mixture, for example, can comprise a slurry that may be atomized or sprayed into a reactor. Similarly, a dry feedstock mixture may be atomized or sprayed into the reactor.

The physically activating gases, which may for example be $H_2O$, $O_2$, $CO_2$, $H_2$, $NH_3$, or any gas mixture containing these gases, may be introduced into the reactor via at least one gas inlet in order to activate the feedstock mixture from the gas phase to generate micropores. Additionally, depending on the specific physically activating gas, conditions may be chosen such that said activating gas may also serve as protective gas to avoid the carbonaceous precursor from oxidizing by oxygen in the air and fluidize the feedstock mixture within the reactor. For example, $O_2$ may be diluted by $N_2$, while $NH_3$ may be used as pure gas. The physically activating gas may be introduced into the activation reactor at any stage, either before heating or after the reactor is heated to a specific temperature. The physically activating gases may be introduced into the activation reactor continually or intermittently. The physically activating gases may be diluted with inert gases to any concentration before being introduced into the activation reactor in order to tune the physical activation intensity.

The feedstock mixture may be heated under the atmosphere of a physically activating gas at a heating rate of 2 to 1000° C./min, e.g. 2, 5, 10, 20, 50, 100, 250, 500, 750, or 1000° C./min, to a temperature that may be between 400° C. and 1500° C., e.g. 400, 450, 500, 550, 600, 650, 700, 750, 800, 850, 900, 950, 1000, 1100, 1200, 1300, 1400, or 1500° C., for a predetermined time, e.g. 0.1, 0.2, 0.5, 1, 2, 4, 8, 12, 24, 48, or 72 hours or longer to perform the activation. After activation, the activated product may be cooled down at a cooling rate between 2 and 200° C./min, e.g. 2, 3, 5, 10, 20, 50, 100, 150, or 200° C./min.

In embodiments, the activated carbon may be subjected to suitable post-activation treatment, which, depending on applications, may include washing, drying, and grinding to a desired particle size. The washing may be optimised to remove residual amounts of carbon, retained chemically activating agents, or any chemical by-product derived from reactions involving the chemically activating agent. In one embodiment, the activation step may be quenched by rinsing the activated carbon with water, and thus the acts of quenching and washing may also be combined. Waste water used for quenching and/or washing may be filtered and recycled in order to reduce waste water discharging and process cost.

Activated carbon produced via the present invention may be characterized by a high specific surface area, preferably >2000 $m^2$/g, and predefined pore size distribution, which may be tuned according to applications. For activated carbon to be used in supercapacitors, the desired pore size distribution comprises predominately small micropores and small mesopores. Thus, activated carbon produced according to the invention may be a very attractive electrode material for supercapacitor.

In a second aspect, the invention relates to an activated carbon species obtainable by the method according to the first aspect of the invention. The activated carbon species may thus be tuned to have a pore size distribution optimised for use in a carbon electrode, e.g. similar to the pore size distributions shown in FIG. 1-7. The carbon species with pore size distribution optimized for a carbon electrode comprises small micropores, which are beneficial for a high specific capacitance, and small mesopores, which are beneficial for fast ion transfer. Said carbon electrode with optimised pore size distribution may be used in e.g. supercapacitors or lithium ion capacitors.

BRIEF DESCRIPTION OF THE DRAWINGS

In the following is described examples of preferred embodiments illustrated in the accompanying drawings, wherein.

DETAILED DESCRIPTION OF THE DRAWINGS

Examples

Figure 1:
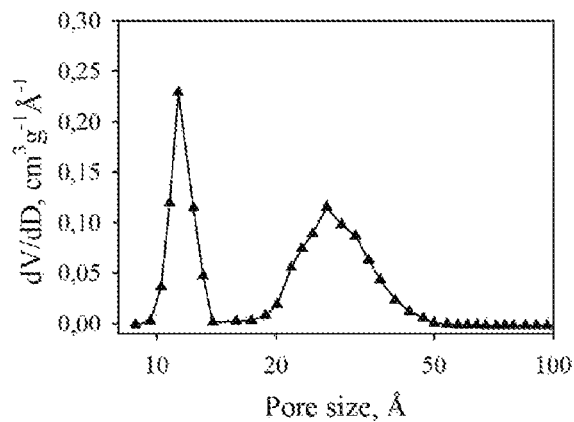
FIG. 1 Shows a diagram of the pore size distribution (presented as dV/dD, i.e. the total volume per unit mass of pores having a characteristic pore size) of the produced activated carbon of example 1 with $H_3PO_4$ and $C_7H_7K$ as chemically activating agents and ammonia as physically activating agent according to the invention.

In example 1, 10 g pine wood sawdust as carbonaceous precursor is impregnated with 30 ml 1 M $H_3PO_4$ aqueous solution as a first chemically activating agent, followed by drying at 120° C. for 12 hours in an oven to form an impregnated precursor. Afterwards, 2 g $C_7H_7K$ as a second chemically activating agent is grinded physically and homogeneously with the impregnated precursor to form a feedstock mixture. The feedstock mixture is thereafter introduced into a tube furnace, heated to 900° C. at a heating rate of 5° C./min, and dwelled for 2 hours under an ammonia atmosphere as a physically activating agent, after which the tube furnace is cooled down to ambient temperature under $N_2$ atmosphere. The activation is operated under atmospheric pressure. As post-activating treatment, the activated carbon is washed with 1 M HCl and hot water, and then dried in an oven. The obtained activated carbon exhibits a high specific surface area (>2000 $m^2$/g) and favourable pore size distribution, dominated by small micropores and small mesopores as seen in FIG. 1. A symmetrical supercapacitor fabricated by using this activated carbon as electrode materials and ionic liquid 1-Ethyl-3-methylimidazolium tetrafluoroborate (EMIMBF$_4$) as electrolyte shows a high specific capacitance of about 190 F/g (calculated from the charge-discharge curve shown in FIG. 8).

Figure 2:
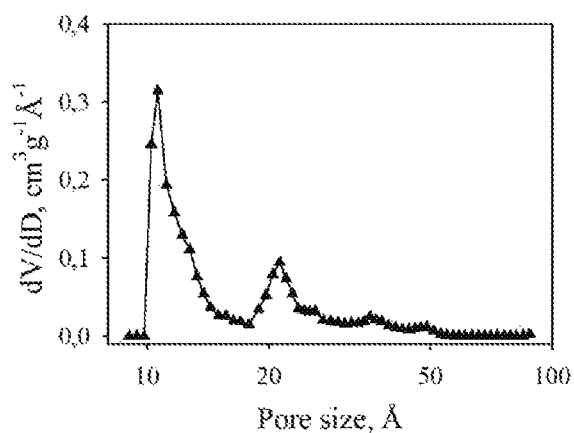
FIG. 2 Shows a diagram of the pore size distribution of the produced activated carbon from the method described in example 2.

In example 2, 10 g pine wood sawdust as carbonaceous precursor is impregnated with 30 ml 1 M $ZnCl_2$ aqueous solution as a first chemically activating agent before drying at 120° C. for 12 hours in an oven to form an impregnated precursor. Afterwards, 10 g KOH as a second chemically activating agent is grinded physically and homogeneously with the impregnated precursor to form a feedstock mixture. The feedstock mixture is thereafter introduced into a tube furnace, heated to 900° C. at a heating rate of 10° C./min, and dwelled for 1 hour under a $CO_2$ atmosphere as a physically activating agent, after which the tube furnace is cooled down to ambient temperature under $N_2$ atmosphere. The activation is operated under atmospheric pressure. As post-activating treatment, the obtained product is washed with 1 M HCl and hot water, and then dried in an oven. The obtained activated carbon exhibits a high specific surface area (>2000 m$^2$/g) and favourable pore size distribution (dominated by small micropores and small mesopores as seen in FIG. 2).

Figure 3:
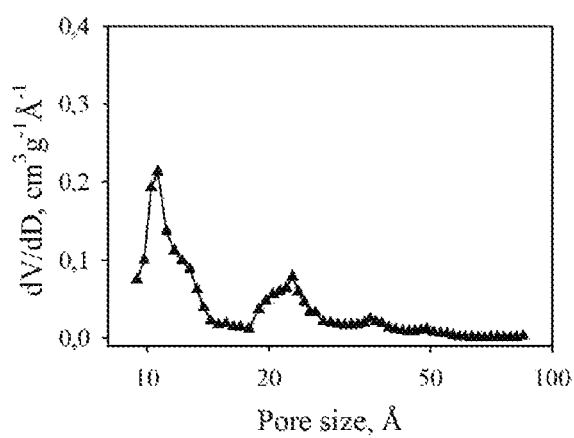
FIG. 3 Shows a diagram of the pore size distribution of the produced activated carbon from the method described in example 3.

In example 3, 10 g waste newspaper as carbonaceous precursor is impregnated with 30 ml 0.5 M $ZnCl_2$ aqueous solution as a first chemically activating agent before drying at 120° C. for 12 hours in an oven to form an impregnated precursor. Afterwards, 5 g NaOH as a second chemically activating agent is grinded physically and homogeneously with the impregnated precursor to form a feedstock mixture. The feedstock mixture is thereafter introduced into a tube furnace, heated to 800° C. at a heating rate of 10° C./min, and dwelled for 1 hour under an ammonia atmosphere as a physically activating agent, after which the tube furnace is cooled down to ambient temperature under $N_2$ atmosphere. The activation is operated under atmospheric pressure. As post-activating treatment, the obtained product is washed with 1 M HCl and hot water, and then dried in an oven. The obtained activated carbon exhibits a high specific surface area (>2200 m$^2$/g) and favourable pore size distribution (dominated by small micropores and small mesopores seen in FIG. 3).

Figure 4:
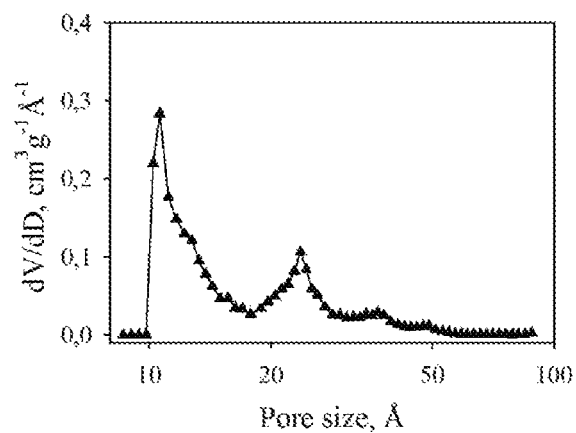
FIG. 4 Shows a diagram of the pore size distribution of the produced activated carbon from the method described in example 4.

In example 4, 10 g waste newspaper as carbonaceous precursor is mixed with 20 g $P_2O_5$ as a first chemically activating agent by physical grinding to form an impregnated precursor. Afterwards, 5 g KOH as a second chemically activating agent is grinded physically and homogeneously with the impregnated precursor to form a feedstock mixture. The feedstock mixture is thereafter introduced into a tube furnace, heated to 750° C. at a heating rate of 5° C./min, and dwelled for 2 hours under a $CO_2$ atmosphere as a physically activating agent, after which the tube furnace is cooled down to ambient temperature under $N_2$ atmosphere. The activation is operated under atmospheric pressure. As post-activating treatment, the obtained product is washed with 1 M HCl and hot water, and then dried in an oven. The obtained activated carbon exhibits a high specific surface area (>2000 m$^2$/g) and favourable pore size distribution (dominated by small micropores and small mesopores seen in FIG. 4).

Figure 5:
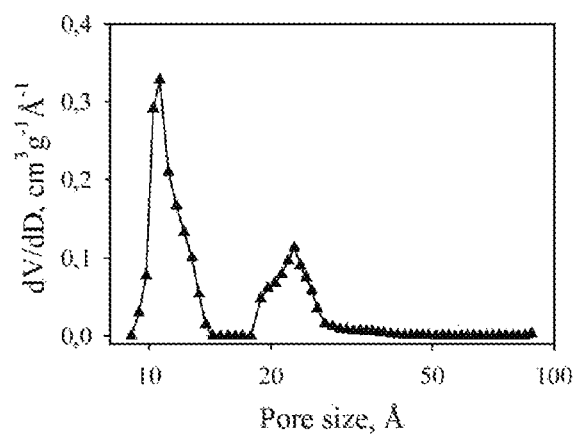
FIG. 5 Shows a diagram of the pore size distribution of the produced activated carbon from the method described in example 5.

In example 5, 10 g pine wood sawdust as carbonaceous precursor is impregnated with 30 ml 1 M $ZnCl_2$ aqueous solution as a first chemically activating agent before drying at 120° C. for 12 hours in an oven to form an impregnated precursor. Afterwards, 5 g $K_2CO_3$ as a second chemically activating agent is grinded physically and homogeneously with the impregnated precursor to form a feedstock mixture. The feedstock mixture is thereafter introduced into a tube furnace, heated to 900° C. at a heating rate of 10° C./min, and dwelled for 2 hours under a $CO_2$ atmosphere as a physically activating agent, after which the tube furnace is cooled down to ambient temperature under $N_2$ atmosphere. The activation is operated under atmospheric pressure. As post-activating treatment, the obtained product is washed with 1 M HCl and hot water, and then dried in an oven. The obtained activated carbon exhibits a high specific surface area (>2000 m$^2$/g) and favourable pore size distribution (dominated by small micropores and small mesopores seen in FIG. 5).

Figure 6:
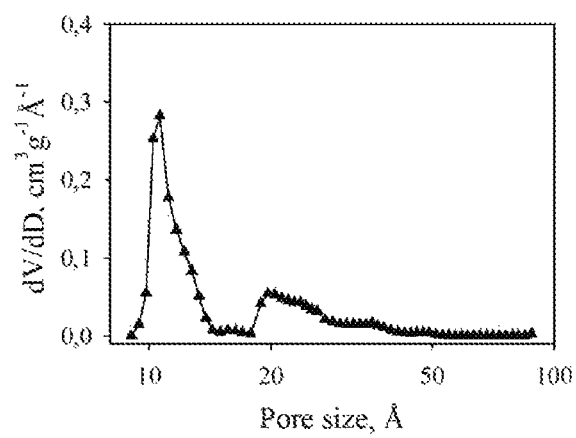
FIG. 6 Shows a diagram of the pore size distribution of the produced activated carbon from the method described in example 6.

In example 6, 10 g polyaniline powder as carbonaceous precursor is mixed with 5 g $P_2O_5$ as a first chemically activating agent by physical grinding to form an impregnated precursor. After drying for 12 hours at 120° C., 5 g $K_2CO_3$ as a second chemically activating agent is grinded physically and homogeneously with the impregnated precursor to form a feedstock mixture. The feedstock mixture is thereafter introduced into a tube furnace, heated to 900° C. at a heating rate of 10° C./min, and dwelled for 2 hours under a steam atmosphere as a physically activating agent, after which the tube furnace is cooled down to ambient temperature under $N_2$ atmosphere. The activation is operated under atmospheric pressure. As post-activating treatment, the obtained product is washed with 1 M HCl and hot water, and then dried in an oven. The obtained activated carbon exhibits a high specific surface area (>2300 m$^2$/g) and favourable pore size distribution (dominated by small micropores and small mesopores seen in FIG. 6).

Figure 7:
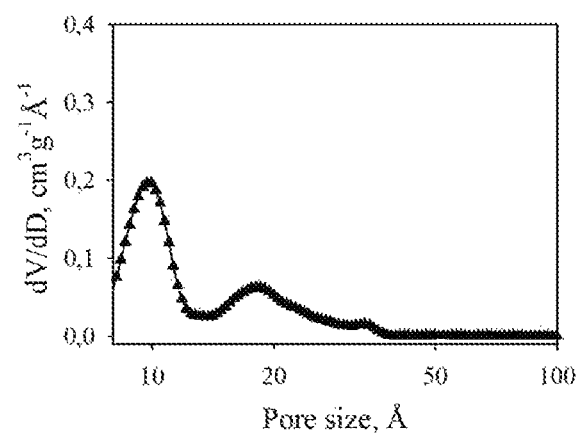
FIG. 7 Shows a diagram of the pore size distribution of the produced activated carbon from the method described in example 7.

In example 7, 10 g graphene oxide as carbonaceous precursor is mixed with 20 g $ZnCl_2$ as a first chemically activating agent by physical grinding to form an impregnated precursor. After drying for 12 hours at 120° C., 10 g KOH as a second chemically activating agent is grinded physically and homogeneously with the impregnated precursor to form a feedstock mixture. The feedstock mixture is thereafter introduced into a microwave oven and heated at a power of 600 W for 20 min under an ammonia atmosphere as a physically activating agent, after which the material is cooled down to ambient temperature under $N_2$ atmosphere. The activation is operated under atmospheric pressure. As post-activating treatment, the obtained product is washed with 1 M HCl and hot water, and then dried in an oven. The obtained activated carbon exhibits a high specific surface area (>2200 m$^2$/g) and favourable pore size distribution (dominated by small micropores and small mesopores seen in FIG. 7).

Figure 8:
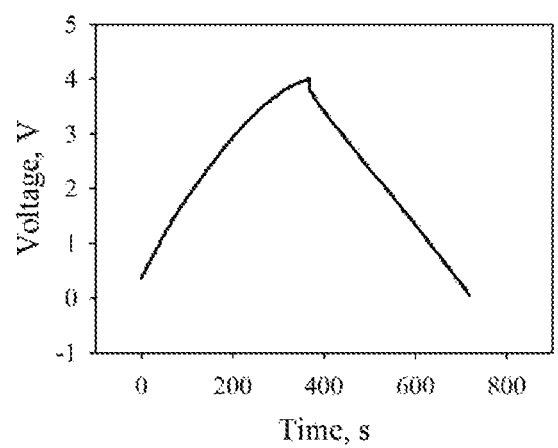
FIG. 8 Shows a charge/discharge curve of a supercapacitor fabricated using activated carbon produced according to the invention as electrode and ionic liquid 1-Ethyl-3-methylimidazolium tetrafluoroborate as electrolyte.

In example 8, an optimised electrode, based on activated carbon produced by the activation method disclosed within this application, is fabricated by combining the activated carbon with conductive carbon black as a conductive additive and polytetrafluoroethylene (PTFE) as a binder. A powder mixture comprising 60-90 wt % activated carbon, 5-20 wt % carbon black, and 5-20 wt % PTFE is rolled and pressed to form a carbon-based electrode with a thickness in the range of about 40-400 micrometers. A supercapacitor is assembled by using the carbon-based electrode as electrode and ionic liquid as electrolyte. The charge-discharge performance of a supercapacitor produced by this method is shown in FIG. 8.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. A method for producing activated carbon, said method comprising the steps of:
   a. mixing a carbonaceous precursor with chemically activating agents to obtain a feedstock mixture;
   b. producing activated carbon by heating the feedstock mixture under the atmosphere of a physically activating gas; and
   c. performing post-activation treatment of the produced activated carbon via at least one of washing, drying or grinding, wherein step a) comprises in sequence the sub-steps of:
      i. addition of a first chemically activating agent to obtain an impregnated precursor; and
      ii. addition of a second chemically activating agent to obtain the feedstock mixture;
   wherein the first chemically activating agent is selected from the group consisting of $MgCl_2$, $AlCl_3$, $CaCl_2$, $FeCl_3$, $ZnCl_2$, $H_3PO_4$, $P_2O_5$ and $H_2SO_4$, and
   wherein the second chemically activating agent is selected from the group consisting of $K_2CO_3$, $Na_2CO_3$, $Li_2CO_3$, $KHCO_3$, $NaHCO_3$, $LiHCO_3$, KOH, NaOH, LiOH and benzyl potassium ($C_7H_7K$).

2. The method according to claim 1, wherein a mass ratio of the carbonaceous precursor to the first chemically activating agent ranges from 1:10 to 1000:1.

3. The method according to claim 1, wherein the carbonaceous precursor and the first chemically activating agent are mixed with assistance of a solvent.

4. The method according to claim 1, wherein the mass ratio of the impregnated precursor and the second chemically activating agent ranges from 1:10 to 1000:1.

5. The method according to claim 1, wherein the feedstock mixture is introduced into a reactor through a batch feed process.

6. The method according to claim 1, wherein the feedstock mixture is introduced into a reactor through a continuous feed process.

7. The method according to claim 1, wherein the physically activating gas is selected from the group consisting of $H_2O$, $H_2$, $O_2$, $CO_2$, $SO_2$, $SO_3$, and $NH_3$.

8. The method according to claim 1, wherein the physically activating agent is introduced into the activation reactor after heating of said activation reactor.

9. The method according to claim 1, wherein heating is carried out at a temperature ranging from 400 to 1500° C.

* * * * *